United States Patent [19]
Geisthoff

[11] 4,437,553
[45] Mar. 20, 1984

[54] FREEWHEELING CLUTCH ASSEMBLY

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 330,792

[22] Filed: Dec. 15, 1981

[30] Foreign Application Priority Data

Dec. 19, 1980 [DE] Fed. Rep. of Germany ....... 3047891

[51] Int. Cl.³ ...................... F16D 41/06; F16D 41/12
[52] U.S. Cl. .......................................... 192/46; 192/71; 188/82.1; 188/82.8; 464/37
[58] Field of Search ..................... 192/46, 71, 45.1, 64, 192/41 A; 188/82.8, 82.1, 82.77, 82.7; 464/37, 30

[56] References Cited

U.S. PATENT DOCUMENTS 1,873,079  8/1932  Veeder ............................... 192/46 X
2,818,950  1/1958  Harless .............................. 192/46 X
2,902,864  9/1959  Digby ................................ 464/37 X
4,363,390 12/1982 Eisend et al. ........................ 192/46

FOREIGN PATENT DOCUMENTS 1049732 12/1953 France ............................. 192/41 A
 375419  5/1973 U.S.S.R. ............................ 192/46

Primary Examiner—Rodney H. Bonck
Assistant Examiner—David D. House
Attorney, Agent, or Firm—Toren, McGeady and Stanger

[57] ABSTRACT

A freewheeling clutch assembly wherein pawl members are mounted for pivotal movement in one of a driven and driving member of the clutch assembly and wherein ratchets are formed in the other member. When the driven member overruns the driving member, pivotal movement of the pawls causes their disengagement with the ratchets and the clutch will freewheel. When the driving member commences again to overrun the driven member, resilient annular means interposed between the members will cause the pawl members to be pivoted back into their torque transmitting position.

14 Claims, 10 Drawing Figures

FREEWHEELING CLUTCH ASSEMBLY

The present invention relates generally to freewheeling clutch assemblies and more particularly to an assembly wherein torque transmitting members are pivotally arranged in one part of the clutch in order to be brought into engagement with recesses in another part of the clutch for effecting torque transmission between the clutch members.

More particularly, the invention relates to freewheeling clutches of the type wherein pawl and ratchet means may be interposed between the driving and driven members of the clutch in order to effect engagement and disengagement of the clutch members.

A freewheeling clutch having driving members which are pivotally arranged in one clutch part and which consist of a bearing roller provided with ratchets is known from German Patent No. 736,591. In the case of a freewheeling clutch of this construction, one of a plurality of rubber-elastic support members are vulcanized on a clutch hub with the driving members being held therein. The pivotability of the driving members is insured by the elasticity of the rubber-elastic support members. The inside of the clutch sleeve of this assembly is also fitted by vulcanization with a rubber-elastic ring provided with recesses for the purpose of receiving driving members the outside of which includes cylindrical supporting rollers.

A freewheeling clutch of the type above described and formed in accordance with the prior art exhibits disadvantages in its behavior due to the fact that highly elastic operating characteristics tend to develop. This is especially disadvantageous when the clutch is used in the driving arrangement for an agricultural implement which exhibits a high degree of irregularity and which is normally attached to a tractor since the clutch characteristics will have a disadvantageous effect on the operating behavior of the implement.

Furthermore, in devices of the prior art the amount of torque which may be transmitted is limited due to the deformation which will occur in the rubber-elastic element.

Accordingly, the present invention is directed toward provision of a freewheeling clutch wherein switching of the clutch into the torque transmitting condition will be subjected to a damping process which in the direction of torque transmission will demonstrate a more rigid behavior and a more positive locking action and wherein when re-engagement of the clutch must occur the driving members will be held in proper alignment.

SUMMARY OF THE INVENTION

Briefly, the present invention may be described as a freewheeling clutch assembly comprising a driving member, a driven member, clutch engaging means operatively interposed between the driving and the driven members to effect driving engagement therebetween and to disengage said members for freewheeling operation when the driven member overruns the driving member and re-engagement means for urging said clutch engaging means into driving engagement between said driving and driven members. The clutch engaging means comprise pawl means pivotally mounted in one of the driving and driven members and ratchet means on the other of the members adapted to be engaged and disengaged by the pawl means. The engagement means comprise resilient means affixed to the other of said driving and driven members for pivoting the pawl means into driving engagement with the ratchet means when the driving member commences to overrun the driven member thereby to reestablish torque transmission therebetween.

In the structure of the invention, the pawl means are essentially formed as bearing rollers having pawl members thereon with the overall length of the bearing rollers being longer than the length thereof occupied by the pawl members. The pawl members of the bearing rollers project radially from the one clutch part receiving the pawl means and the resilient means comprise a rubber-elastic ring which is held in frictional engagement with the bearing rollers radially therefrom so as to cause pivotal movement of the bearing rollers to effect re-engagement of the clutch.

An advantage of the design of the present invention is that due to the deformability of the rubber-elastic ring the area of contact thereof with the bearing rollers is such that a friction fit and interference fit are superimposed. As compared with freewheeling mechanisms which are switched by friction locking, this arrangement achieves a much safer switching process and it therefore insures that all driving members will simultaneously be brought from the freewheeling position into the torque transmitting position and vice versa.

It is also an advantage of the invention that in the freewheeling position the driving members will remain safely disengaged from the recesses or ratchets of the adjacent clutch member.

A further advantage of the freewheeling clutch assembly in accordance with the invention involves the fact that the clutch may easily be adjusted for different directions of rotation by fitting the driving members in a reverse manner.

Further advantages of the invention arise from further more detailed aspects thereof.

For example, by dividing the driving members into two groups which in their angular position are arranged in such a way as to be offset by half the pitch of the ratchets in the adjacent clutch member, the angles of rotation through which the clutch must rotate before it is re-engaged in the torque transmitting position are reduced.

If in one of the clutch members the ratchets are wider in the circumferential direction than the diameter of the bearing rollers, then an opposite characteristic is achieved in that an increase in angle of rotation must occur before torque transmitting re-engagement and this may be found to be advantageous in certain applications.

Additionally, the ratchet and pawl means of the invention may have their inter-engaging parts provided with a toothed configuration having finer teeth and for torque transmitting purposes this results in a very short reengagement angle and has the additional advantage that in view of the deformation of the rubber-elastic ring which is possible in the circumferential direction, the probable percentage of engagement of the driving members is increased.

By providing the rubber-elastic ring with teeth directed toward the face which cooperates with the bearing rollers, rolling resistance of the clutch in the freewheeling direction will be reduced.

By aligning the teeth at an angle relative to the radial line, it is possible to achieve an even smaller rolling resistance of the freewheeling clutch in the free-wheeling direction without loss of effectiveness when switching into the torque transmitting position.

In cases where particularly high loads must be transmitted it may be advantageous to load the driving members in the direction of their torque transmitting position by an additional spring member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
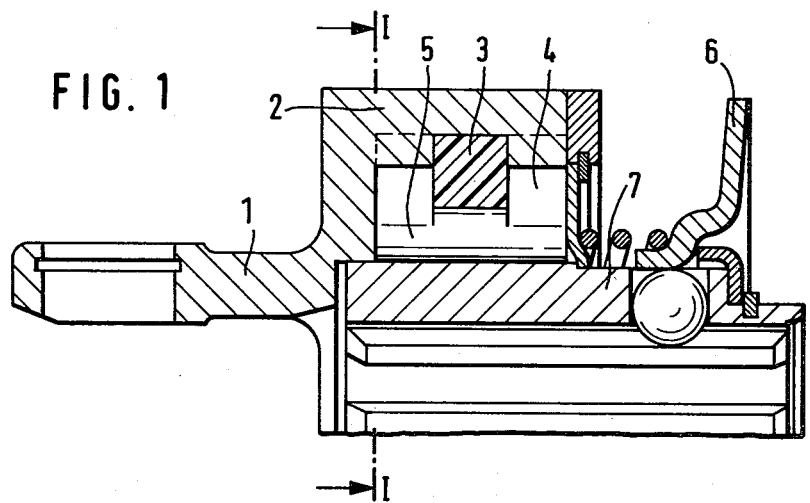
FIG. 1 is a longitudinal sectional view showing a clutch assembly in accordance with the invention.

Referring now to FIG. 1 wherein there is depicted a first embodiment of the invention, the freewheeling clutch assembly of the invention is shown as essentially consisting of a clutch hub which is formed basically as a slip-on hub 7 and which by means of a quick-action locking mechanism 6 may be secured against axial displacement upon, for example, the power take-off shaft of a tractor. The clutch includes a clutch sleeve 2 which is formed integrally with a joint yoke 1.

Bearing rollers 5 constitute clutch engaging means or driving members of the clutch assembly and they are pivotally held in recesses 8 of the slip-on hub 7. In the embodiment shown in FIG. 1, the clutch hub 7 may operate as a driving member and the clutch sleeve 2 may be considered the driven member.

Figure 2:
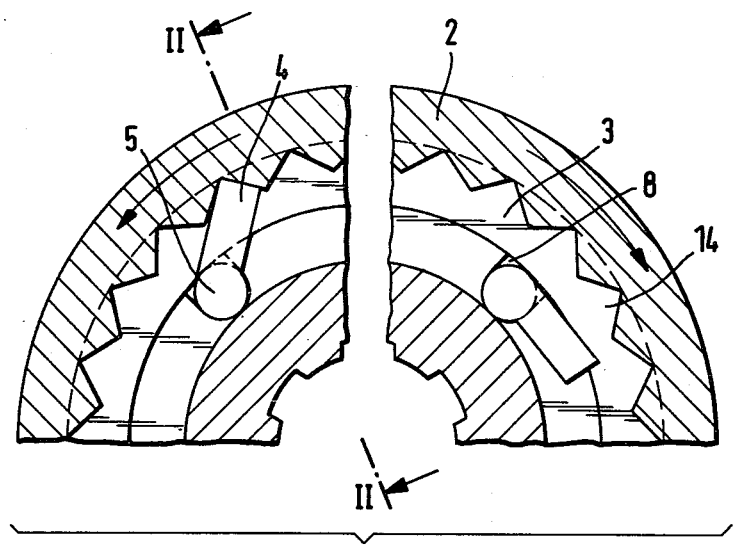
FIG. 2 is a cross-sectional view taken along the line I—I of FIG. 1 with the left half of FIG. 2 illustrating the torque transmitting position of the clutch and with the right half illustrating the freewheeling position.

As best seen in FIG. 2, the clutch sleeve 2 is divided on the inner surface thereof with ratchets 14. The pivotal bearing roller members 5 mounted on the driving member of the clutch are pivotally held in recesses 8 upon the slip-on hub 7, as best seen in FIG. 2. As viewed in FIG. 1, the longitudinal ends of the bearing rollers 5 have been provided with pawl members 4 which extend radially outwardly terminating approximately tengentially with the bearing rollers 5.

In the longitudinally central area of the bearing rollers 5, there are provided resting against a pretensioning force a rubber-elastic ring 3 which is nonrotatably connected with the clutch sleeve 2 so that a connection which more or less presents an interference fit is produced.

In a case where the clutch sleeve 2 commences to overrun the slip-on hub 7, which may be designated as the freewheeling condition of the clutch assembly, the bearing rollers 5 of the driving member will be rotated or pivoted in such a way that the pawl members 4 will be turned inwardly toward the slip-hub 7 and for as long as the freewheeling position is maintained they will keep a distance from the inner boundary of the clutch sleeve 2. Thus, as shown in the right side of FIG. 2, the pawl members 4 will be disengaged from the ratchets 14 provided in the driven member 2.

In the case of underrunning of the clutch sleeve 2, that is where the driving member or slip-on hub 7 commences to rotate faster than the driven member or clutch sleeve 2, because of the connection between the bearing rollers 5 and the rubber-elastic ring 3, the pawl members 4 will be swivelled outwardly and will then re-engage into the recesses or ratchets 14 formed on the inside of the clutch sleeve 2.

Due to the difference in radius between the axis of the bearing rollers 5 and the area of contact between the bearing rollers 5 and the rubber-elastic ring 3 (radius of the bearing rollers 5) on the one hand and the length of the pawls 4 on the other hand, a lever ratio is achieved which requires an extremely short angle of rotation for reversing the freewheeling mechanism.

Figure 3:
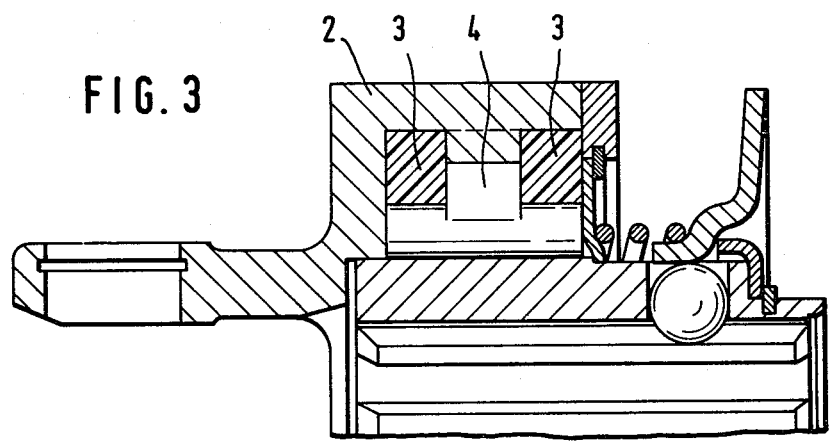
FIG. 3 is a longitudinal sectional view of another embodiment of the invention.

In the case of a freewheeling clutch illustrated in FIG. 3, the center of each bearing roller 5 is provided with a pawl 4 and a rubber-elastic ring 3 acting on the bearing rollers 5 is located on either side of the pawls 4.

Figure 4:
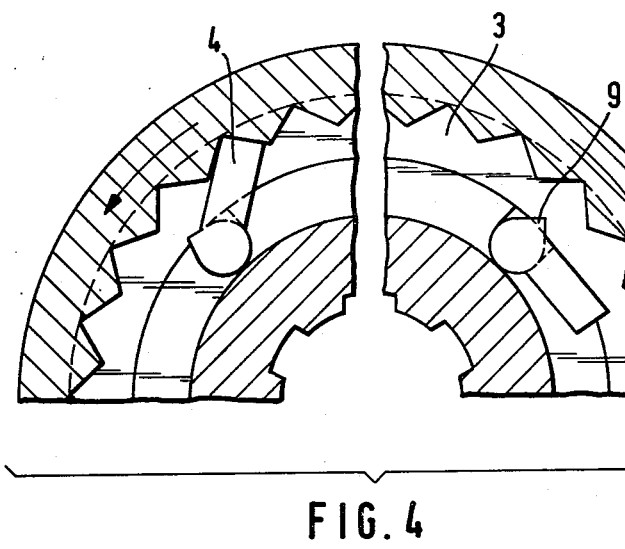
FIG. 4 is a cross-sectional view taken through a clutch mechanism wherein the clutch engaging means have been provided with an engaging cam.

The bearing rollers 5 of the freewheeling clutch illustrated in FIG. 4 have each been provided with an additional engaging cam 9 as a result of which the working connection between the bearing roller 5 and the rubber-elastic ring 3 is turned into a kind of interference fit.

Figure 5:
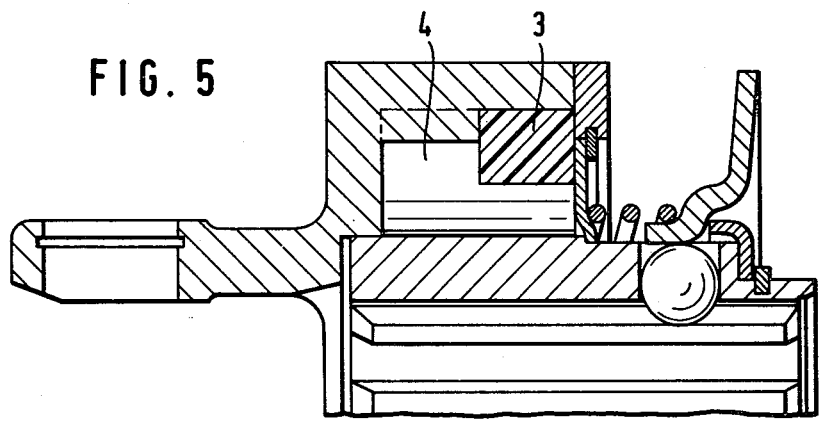
FIG. 5 is a longitudinal sectional view illustrating a further embodiment of the invention.

FIG. 5 shows a further embodiment of a freewheeling clutch in accordance with the present invention wherein a pawl member 4 is arranged on one end of the bearing roller 5 and the working connection between the bearing roller 5 and the rubber-elastic ring 3 has been provided on the opposite end of the bearing roller 5.

Figure 6:
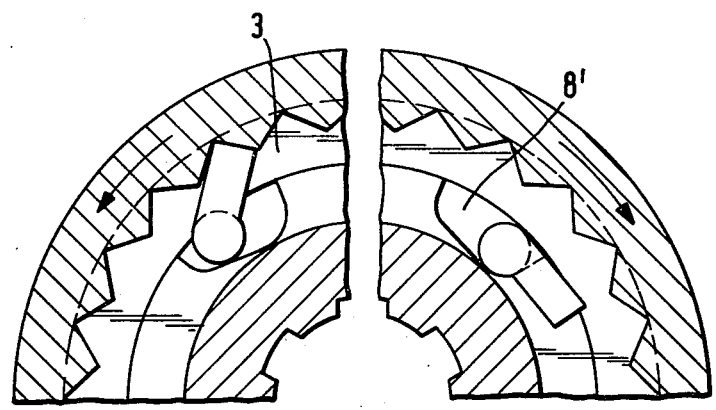
FIG. 6 is a cross-sectional view showing clutch engaging members in the form of bearing rollers arranged in recesses and movable in the circumferential direction.

FIG. 6 illustrates a freewheeling hub clutch assembly wherein recesses 8' are provided on the slip-on hub 7 which serve to receive the bearing rollers with the recesses 8' being longer in the circumferential direction than the diameter of the bearing rollers 5. With the recesses 8' in the direction opposite to the direction of rotation of the slip-on hub 7, the torque transmitting position has a decreasing radial depth. As a result of this arrangement, the working connection between the bearing roller 5 and the rubber-elastic ring 3 is intensified in the torque transmitting direction whereas it is reduced in the freewheeling direction so that the clutch sleeve overruns in a relatively friction free manner. Additionally, the design of FIG. 6 insures that the angle of rotation required for the switching process is increased which may be advantageous for example if the freewheeling clutch is not to follow temporarily occurring vibrations.

Figure 7:
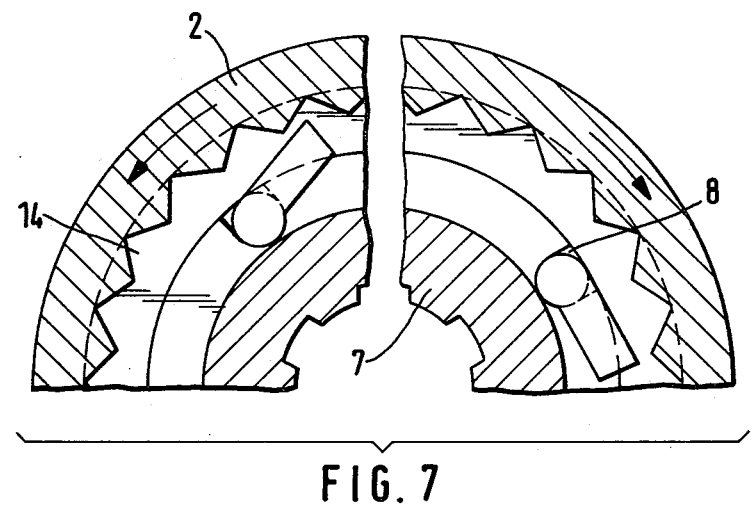
FIG. 7 is a cross-sectional view through a free-wheeling clutch with two groups of driving members.

FIG. 7 depicts a freewheeling clutch assembly which has been provided with two groups of driving members which are held in recesses 8 of the slip-on hub 7, wherein the pitch of the recesses 8 in the slip-on hub 7 of the two groups relative to each other is offset by half the pitch of the recesses or ratchet 14 in the clutch sleeve 2 thereby resulting in an extremely short angle of rotation during the time that the clutch is changed from the freewheeling position into the torque transmitting position.

Figure 8:
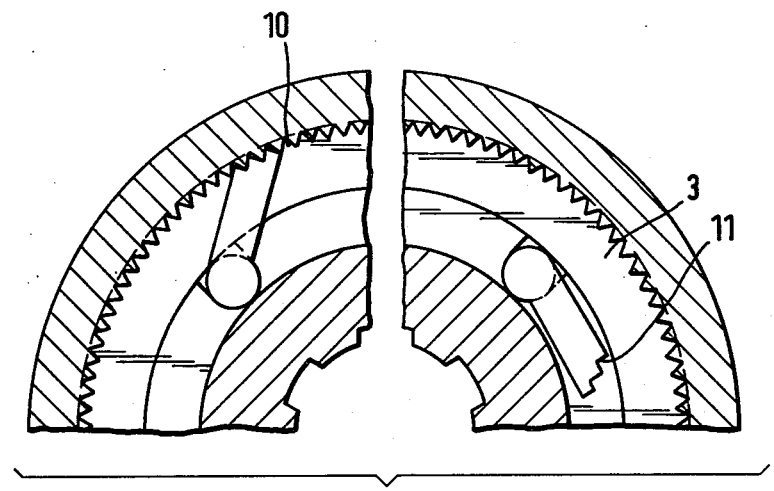
FIG. 8 is a cross-sectional view illustrating an embodiment wherein the pawl and ratchet means of the clutch engaging means are formed with inter-engaging toothed surfaces.

In FIG. 8 there is shown a further embodiment of the invention wherein ratchet teeth are provided both on the inside of the clutch sleeve 2 and on the engaging face of the pawl members. The engaging faces of the pawl members are provided with ratchet teeth 11 having a fine tooth pitch thereby considerably increasing the number of switching-in positions or torque transmitting engagement positions possible with the clutch assembly of FIG. 8. Similarly, the ratchet means or recesses formed in the sleeve 2 are also formed with fine teeth 10 which are adapted to be engaged with the fine teeth formed on the pawl members.

Figure 9:
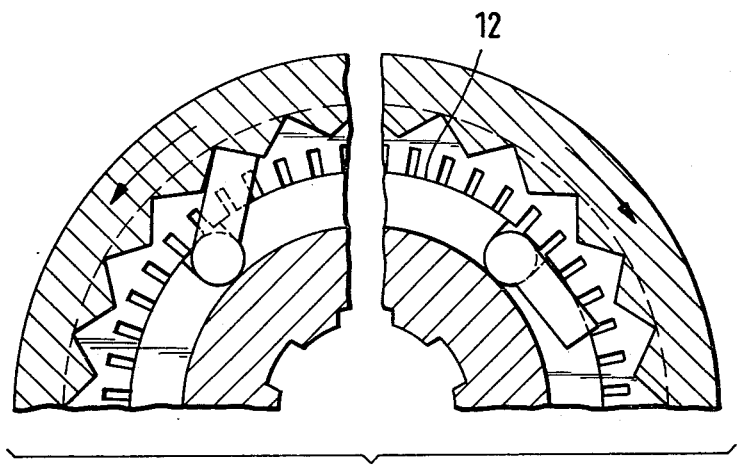
FIG. 9 is a cross-sectional view of a free-wheeling clutch wherein rectangular teeth are provided on the working face of the rubber-elastic ring.

In FIG. 9 there is shown an embodiment wherein the rubber-elastic ring 3 cooperating with the bearing rollers 5 is provided with rectangular teeth 12. The rectangular teeth 12 may also be formed with a wedge shaped configuration and in the arrangement depicted in FIG. 9 the clutch operates with a reduced resistance of rotation in the freewheeling position.

Figure 10:
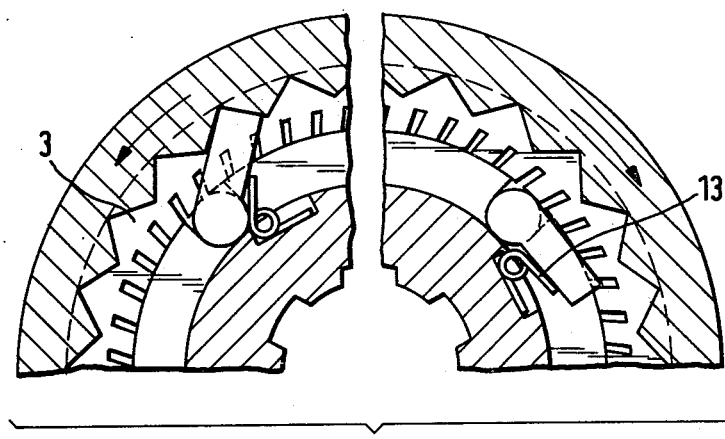
FIG. 10 is a cross-sectional view of an embodiment wherein spaces between the teeth of the rubber-elastic ring deviate from a radial line and wherein a spring member is provided for urging the pawl means toward the re-engaging position.

FIG. 10 shows a further design of the invention wherein the teeth arranged on the rubber-elastic ring 3 facilitate and improve the rotation of the clutch sleeve 2 when overrunning as compared to the design illustrated in FIG. 9, the interference with friction fit being improved in the re-switching direction. It will be seen that in FIG. 10, the teeth have an inclination which deviates from the radial direction of the clutch.

Furthermore, in the embodiment in FIG. 10 there are provided springs 13 which urge the pawl members toward the torque transmitting position and this is particularly useful when larger loads are to be transmitted.

While specific embodiments of the invention have been shown and described in detail to illustrate the application of the inventive principles, it will be understood that the invention may be embodied otherwise without departing from such principles.

What is claimed is:

1. A freewheeling clutch assembly comprising a driving member, a driven member, clutch engaging means operatively interposed between said driving and driven members to effect driving engagement therebetween and to disengage said members for free-wheeling operation when said driven member overruns said driving member, and re-engagement means for urging said clutch engagement means into driving engagement between said driving and driven members, said clutch engagement means comprising pawl means pivotally mounted on one of said driving and driven members and ratchet means on the other of said members adapted to be engaged and disengaged by said pawl means, said re-engagement means comprising resilient means affixed to said other of said driving and driven members for pivoting said pawl means into driving engagement with said ratchet means when said driving member commences to overrun said driven member.

2. An assembly according to claim 1 wherein said resilient means comprise a resilient annular member extending in frictional engagement with said clutch engaging means.

3. An assembly according to claim 1 wherein said pawl means comprise bearing rollers having pawl members extending therefrom, said bearing rollers being longer in the axial direction of said assembly than said pawl members.

4. An assembly according to claim 3 wherein said pawl members are arranged to project radially from said one of said driving and driven members.

5. An assembly according to claim 3 wherein said resilient means comprise an elastic ring extending in frictional engagement with said bearing rollers and operating to rotate said bearing rollers to move said pawl members between a position engaged with and disengaged from said ratchet means.

6. An assembly according to claim 3 wherein said resilient means are in frictional engagement with said bearing rollers in an area axially centered on said bearing rollers and located between a pair of said pawl members located on opposite sides of said axially centered area.

7. An assembly according to claim 3 wherein said resilient means are located in frictional engagement with said bearing rollers on one axial end of said bearing rollers.

8. An assembly according to claim 3 wherein said bearing rollers are provided with an engaging cam which operates to intensify a frictional locking engagement between said bearing rollers and said resilient means.

9. An assembly according to claim 1 wherein said pawl means are provided in two groups which are angularly positioned and arranged in such a way as to be offset by one-half the pitch of said ratchet means.

10. An assembly according to claim 1 wherein said pawl means are pivotally mounted in recesses formed in said one of said driving and driven members extending in the circumferential direction thereof and being wider than the width dimension of said pawl means with the radial depth of said recesses decreasing in a direction opposite to the pivotal direction of said pawl means.

11. An assembly according to claim 1 wherein said pawl means and said ratchet means are provided with interengaging surfaces which are formed with a fine toothed configuration.

12. An assembly according to claim 1 wherein said resilient means comprise an elastic annular ring which is formed with radially projecting teeth cooperating with said clutch engaging means.

13. An assembly according to claim 12 wherein said teeth extend at an angle to a line taken to extend radially of said clutch assembly in a direction opposite to the driving direction.

14. An assembly according to claim 1 further comprising spring means tending to urge said pawl means in a direction toward torque transmitting engagement with said ratchet means.

* * * * *